United States Patent
Aderholt et al.

(10) Patent No.: US 7,270,140 B2
(45) Date of Patent: Sep. 18, 2007

(54) POPPET VALVE ASSEMBLY

(76) Inventors: Steven K. Aderholt, 4200 Palacio Dr., Amarillo, TX (US) 79019; Dennis Hatfield, 8203 Paragon, Amarillo, TX (US) 79119; Franklin B. Piehl, 1000 Ranch Rd. 2381, Bushland, TX (US) 79012

( * ) Notice: Subject to any disclaimer, the term of this patent is extended or adjusted under 35 U.S.C. 154(b) by 65 days.

(21) Appl. No.: 10/832,075

(22) Filed: Apr. 26, 2004

(65) Prior Publication Data

US 2004/0261843 A1 Dec. 30, 2004

Related U.S. Application Data

(60) Provisional application No. 60/465,106, filed on Apr. 24, 2003.

(51) Int. Cl.
*F16K 17/36* (2006.01)
(52) U.S. Cl. .................. 137/71; 137/68.11; 137/68.14
(58) Field of Classification Search ............. 137/68.11, 137/68.14, 71
See application file for complete search history.

(56) References Cited

U.S. PATENT DOCUMENTS

| | | | | |
|---|---|---|---|---|
| 3,930,517 | A | * | 1/1976 | Gagala ..................... 137/329.4 |
| 4,077,422 | A | * | 3/1978 | Brinkley et al. .......... 137/68.14 |
| 7,066,193 | B2 | * | 6/2006 | Aderholt et al. ............... 137/71 |
| 2002/0017319 | A1 | * | 2/2002 | Hintzman et al. ....... 137/68.23 |

* cited by examiner

*Primary Examiner*—Ramesh Krishnamurthy
(74) *Attorney, Agent, or Firm*—Alan R. Thiele (57) ABSTRACT

A poppet valve assembly is sized and constructed for insertion into the lower portion of a flow control valve used within the opening of a cylinder for storing a compressed gas. When the flow control valve is removed, the normally open poppet valve assembly of the present invention is closed by escaping pressure of the compressed gas. The pressure of the compressed gas causes seals to be formed within the poppet valve assembly of the present invention between the exterior of a substantially hollow movable seat plug and the interior of a substantially tubular valve body.

9 Claims, 8 Drawing Sheets

POPPET VALVE ASSEMBLY

This patent application claims the benefit of Provisional U.S. Patent Application Ser. No. 60/465,106 filed Apr. 24, 2003.

FIELD

The present invention pertains to poppet valve assemblies; more particularly, the present invention pertains to pressure activated poppet valve assemblies for preventing the inadvertent release of the contents of a storage vessel used to contain a compressed gas.

BACKGROUND

Compressed gases are used in a variety of applications ranging from medical uses to sophisticated welding operations. Those unfamiliar with either medical or industrial uses of compressed gas have probably observed cylinders of compressed helium at stores or at fairs where balloons are inflated. In some other applications, compressed gas cylinders are even used to contain gases classified as hazardous materials.

Once a storage vessel is filled with compressed gas, a flow control valve is typically put in place to seal the storage vessel. The flow control valve is used for releasing the compressed gas for a desired purpose at a desired flow rate. It is well known in the art that the weakest part of the system for containing a compressed gas is where the flow control valve joins the storage vessel.

The storage vessels, used to contain many compressed gases, typically shaped in the form of a cylinder, are often made of steel. Accordingly, these cylindrically shaped compressed gas containment vessels are heavy and not easy for an individual to move or carry. Further, the size and shape of a long cylindrical compressed gas container makes it difficult to grasp. Because of their small base, it is not unusual for cylinders containing compressed gas to topple over and fall to the ground. Accordingly, specialized racks are often used to secure the positioning of compressed gas cylinders either during storage or transport. Despite the precautions taken and the training provided to those who work with or use cylinders filled with a compressed gas, accidents still occur and cylinders fall over either during transport or use.

Compressed gases may be transported in over-the-road trailers. Such over-the-road trailers often include one or more horizontal cylinders. Each cylinder includes a flow control valve. If the driver inadvertently backs the trailer into a loading dock and either shear the connection or knocks the flow control valve off one of the cylinders containing compressed gas, the stored energy within the compressed gas will cause a rapid evacuation of the contents of the cylinder.

The inadvertent rapid evacuation of compressed gas from a full cylinder of gas stored at a high pressure can be catastrophic for several reasons. First, the force associated with a rapid release of high pressure gas from a cylinder can cause physical injury to anyone standing nearby. Second, if the gas is flammable and located near anything combustible—a fire can start. In the worst of circumstances, the fire can lead to an explosion where the cylinder of compressed gas effectively becomes a bomb. Third, if the compressed gas is a hazardous substance, a rapid release may not provide enough time for those nearby to don protective gear.

There is therefore a need in the art for a system which will prevent the inadvertent release of compressed gas from a gas storage vessel when the flow control valve connected thereto is broken off. Such system should be inexpensive, easy to use and simple to construct and repair.

SUMMARY

The disclosed system of the present invention provides an inexpensive, easy to use, simple poppet valve assembly that will prevent the inadvertent release of compressed gas from a compressed gas storage vessel, such as a cylinder, when the flow control valve connected to the cylinder is accidentally broken off.

The poppet valve assembly of the present invention is a normally open valve that will close when exposed to a release of gas pressure from a compressed gas storage vessel. Keeping the component parts of the poppet valve assembly in a normally open condition is a shear tube. The shear tube is positioned with respect to the flow control valve such that a removal or significant damage to the shear tube portion of the poppet valve assembly will occur if the flow control valve is subjected to forces that would cause it to break off from the compressed gas storage vessel. Thus, when the shear tube is either significantly damaged or is moved from its location, the inner section of the poppet valve assembly is moved by the pressure of the gas escaping from the compressed gas storage vessel to a position where all internal flow passages for compressed gas from within the compressed gas storage vessel are closed. Such action of blocking all internal flow passages within the poppet valve assembly stops the inadvertent release of compressed gas from the storage vessel.

The poppet valve assembly of the present invention is typically located in the lower portion of the flow control valve during normal operation. If the flow control valve broken off so that the shear tube is removed or significantly damaged, a sliding valve assembly including a substantially hollow movable moveable seat plug within the poppet valve assembly is caused to slide within a substantially tubular valve body to a position blocking the flow of compressed gas.

During normal operations, the absence of obstructions within the poppet valve assembly allows the compressed gas to flow through the poppet valve assembly into the flow control valve. But, when the shear tube is significantly damaged or removed, the physical position of the shear tube—which physical position provides the constraint that holds the substantially hollow movable seat plug out of the interior of the substantially tubular valve body within the poppet valve assembly—is no longer available. The pressure of the compressed gas within the cylinder impinges upon a tubular fixed retainer plug affixed to the bottom of the substantially hollow movable seat plug. When the shear tube is no longer in place, the escaping gas passes through the tubular fixed retainer plug and causes the substantially hollow movable seat plug to move within the substantially tubular valve body portion of the poppet valve assembly such that a seal is formed between a surface on the outside of the substantially hollow movable seat plug and an O-ring within the substantially tubular valve body.

BRIEF DESCRIPTION OF THE DRAWING FIGURES

A better understanding of the construction and operation of the poppet valve assembly of the present invention may be had by reference to the drawing figures wherein:

FIG. 1B is an elevational view in partial section of multiple poppet valve assemblies according to the present invention used with a flow control valve and a device attached to the opening in a compressed gas cylinder;

DESCRIPTION OF THE EMBODIMENTS

Figure 1A:
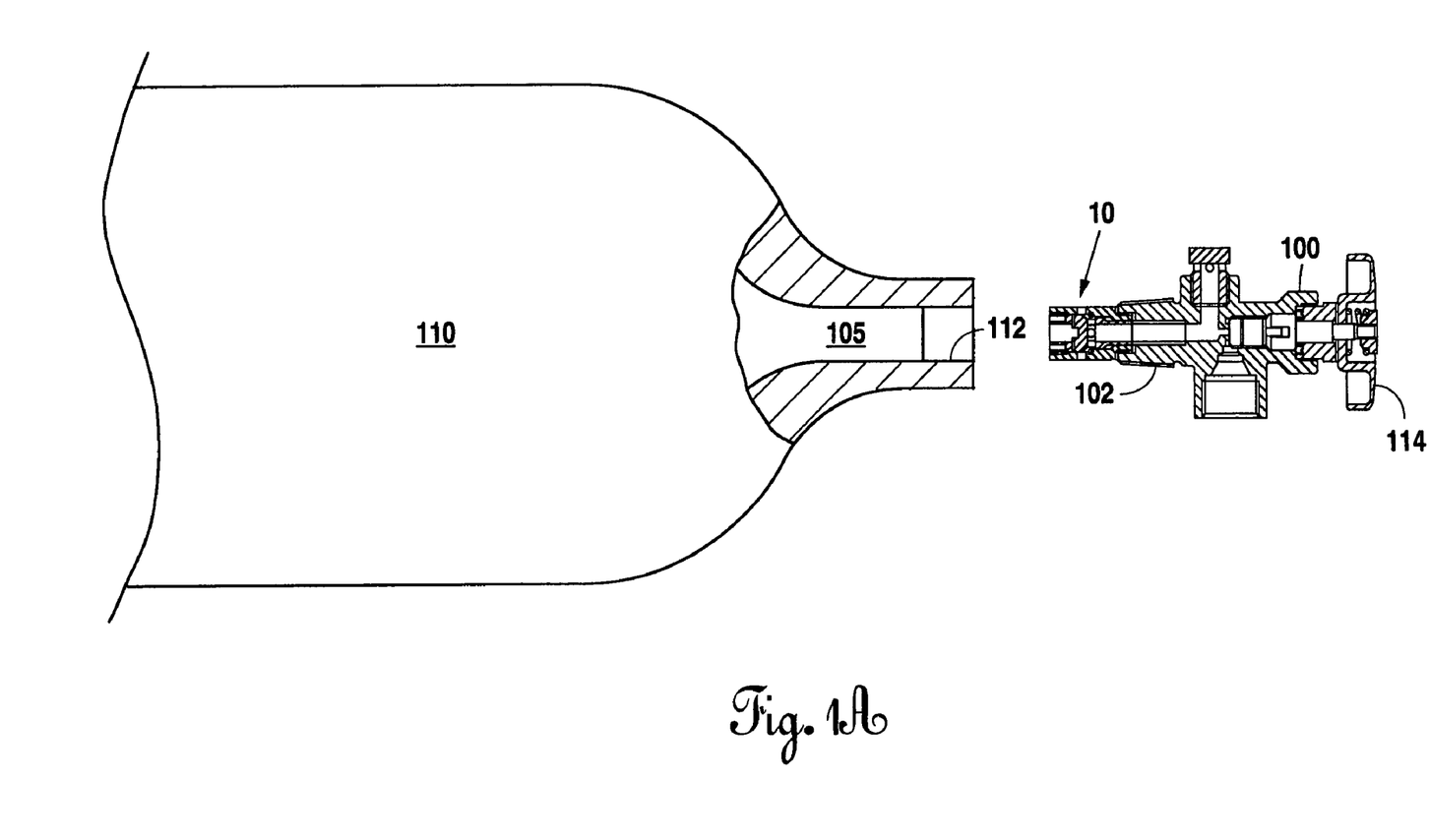
FIG. 1A is an elevational view in partial section of a flow control valve on a compressed gas cylinder with the poppet valve assembly of the present invention positioned therebetween.

As shown in FIG. 1A, the simplest application of the poppet valve assembly 10 of the present invention is within a flow control valve 100. Typically, a flow control valve 100 is placed in the opening 105 of a cylinder 110 containing compressed gas. Normally, such flow control valves 100 have external threads 102 on one end. The external threads 102 engage internal threads 112 formed within the opening 105 of the cylinder 110. This connection is the weakest part of the compressed gas containment. On the other end of the flow control valve 100 is positioned a handle 114. The handle 114 is used to regulate the flow of compressed gas through the flow control valve 100.

If the flow control valve 100 is caused to run into a fixed object or if the flow control valve 100 hits the floor when the cylinder 110 falls over, the flow control valve 100 may be knocked off the cylinder 110. Whenever the flow control valve 100 is knocked off the cylinder 110 a potentially dangerous situation occurs. Specifically, the inadvertent uncontrolled release of compressed gas from within the cylinder 110 may occur.

The poppet valve assembly 10 of present invention is positioned and constructed to place a complete obstruction in the flow path of compressed gas escaping from within the cylinder 110. As shown in FIG. 1B, multiple poppet valve assemblies 10, according to the present invention, may be used whenever a device 115 is also used with a compressed gas containment vessel 110.

Figure 2:
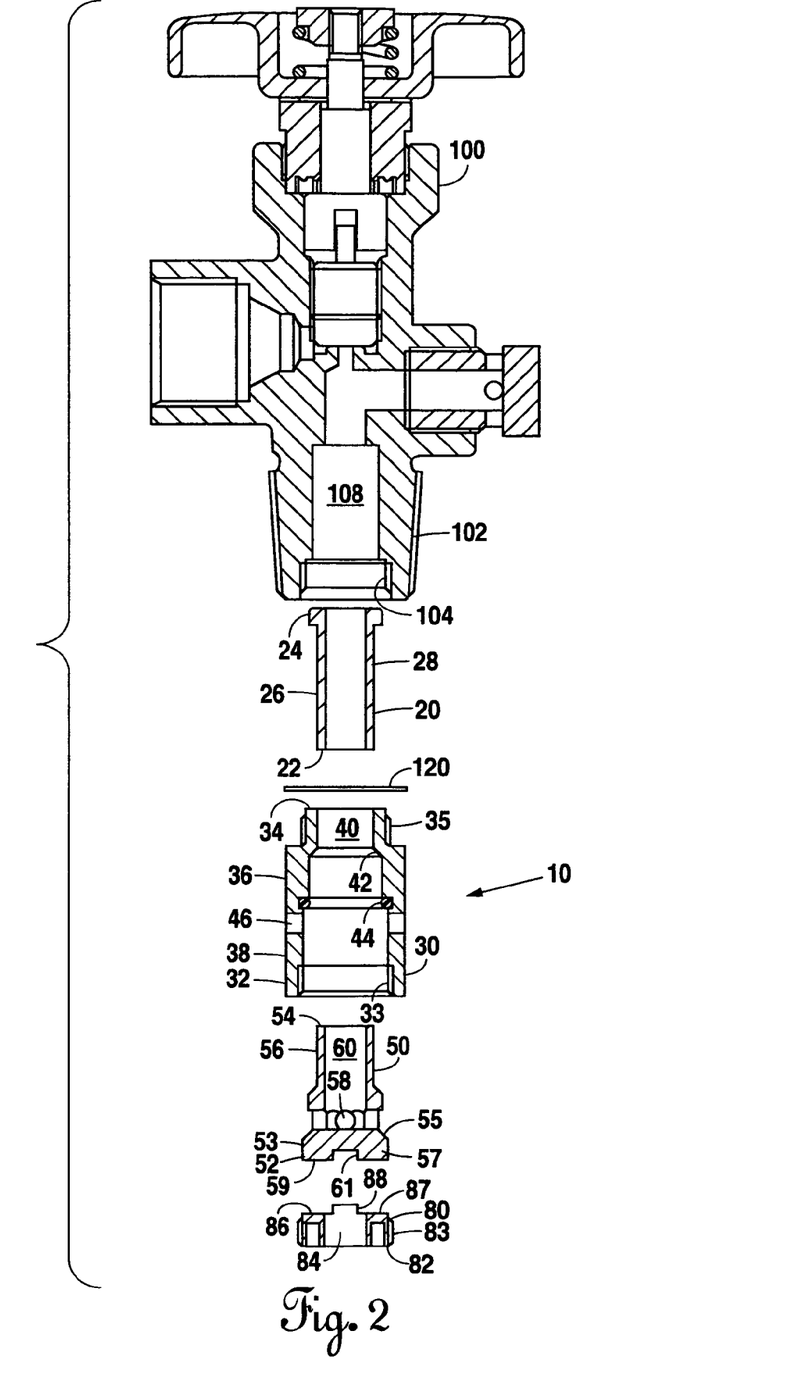
FIG. 2 is an exploded view, in partial section, of a first embodiment the poppet valve assembly of the present invention positioned under a flow control valve

A better understanding of the first embodiment of the poppet valve assembly 10 of the present invention may be had from a description of its component parts as shown in FIG. 2. At the top of FIG. 2 is a flow control valve 100 such as those found in most applications. The flow control valve 100 typically is configured for threadable attachment 102 within an opening 105 formed in a cylinder 110 used to contain a compressed gas.

Extending upwardly into the flow control valve is a shear tube 20. The shear tube 20 typically will be moved if the flow control valve 100 is broken away from the compressed gas containment vessel 110. When the shear tube 20 is removed or significantly damaged the normally open condition of the poppet valve assembly 10 of the present invention will change.

The shear tube 20 has a first or lower end 22 whose utility will be explained below. The second or upper end 24 of the shear tube 20 is sized and shaped for a press or interference fit within a space 108 formed in the bottom of the flow control valve 100, As may be seen in FIG. 2, the size and shape of the second or upper end 24 of the shear tube 20 may appear like a flange. Those of ordinary skill in the art will understand that other attachment methods may be used as long as the functionality of the shear tube is retained.

Figure 3:
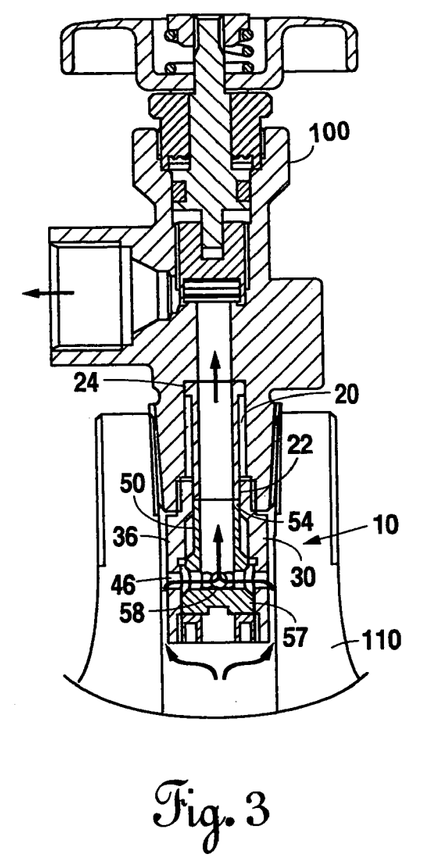
FIG. 3 is an elevational view, in partial section, of the poppet valve assembly shown in FIG. 2, in its normally open configuration allowing the controlled exit of compressed gas from the cylinder through the flow control valve.

The first or bottom end 22 of the shear tube 20 matches the size of the second or upper end 54 of the substantially hollow movable seat plug 50. Thus when the first or bottom end 22 of the shear tube 20 abuts the second or upper end 54 of the substantially hollow movable seat plug 50, as shown in FIG. 3, the substantially hollow movable seat plug 50 is physically constrained from movement along the its common axis with the shear tube 20, as described below.

Between the first or upper end 24 of the shear tube 20 and the second or bottom end 22 of the shear tube 20 is a central cylindrical or hollow tubular portion 26.

The hollow tubular portion 26 of the shear tube 20 extends axially into a substantially tubular valve body 30. The substantially tubular valve body 30 has a first or lower end 32 and a second or upper end 34. The first or lower end 32 of the substantially tubular valve body 30 is internally threaded 33. The utility of these internal threads 33 to provide a threadable connection with the external threads 82 on the tubular fixed retainer plug 80 at the bottom of the poppet valve assembly 10 will be explained below.

The second or upper end 34 of the substantially tubular valve body or housing 30 is externally threaded 35. These external threads 35 are positioned to extend into and engage internal threads 104 within the flow control valve 100.

This threaded engagement of the substantially tubular valve body 30 with the flow control valve 100 holds the poppet valve assembly 10 of the present invention in position with respect to the flow control valve 100. A seal gasket 120 is used to assure a leak free passage for the flow of compressed gas into the flow control valve 100.

Between the first or lower end 32 of the substantially tubular valve body 30 and the second or upper end 34 of the substantially tubular valve body 30 is a hollow portion 36. The hollow portion 36 is characterized by a larger diameter portion 38 extending into the substantially tubular valve body 30 from the first or lower end 32 and a second or smaller diameter portion 40 extending into the substantially tubular valve body 30 from the upper end 34.

In the area between the larger diameter portion 38 and the smaller diameter portion 40 is a first angled surface 42.

An O-ring 44 is placed within the hollow portion 36 of the substantially tubular body 30. It is the compression of this O-ring 44 which forms the seal that prevents the escape of gas from cylinder 110 when the condition of the valve changes from normally open to closed.

Through the wall of the hollow portion 36 of the substantially tubular valve body 30 are formed one or more vent holes 46. As shown in FIG. 3, the vent holes 46 permit the passage of the compressed gas from the cylinder 110 when the poppet valve assembly 10 of the present invention is in its normally open condition.

The upper or second end 34 of the substantially tubular valve body 30 is internally sized for a slidable interfitment with outside diameter 28 of the tubular portion 26 of the shear tube 20. And, because the size of the central portion 56 of the substantially hollow movable seat plug 50, described below, is the same as the outer diameter 28 of the shear tube 20 and the smaller diameter portion 40 at the upper or second end 34 of the substantially tubular valve body 30 a slidable engagement is also provided.

It is the substantially hollow movable seat plug 50 whose movement causes the poppet valve assembly 10 of the present invention to go from a normally open condition to a closed condition when the shear tube 20 is removed. The first or lower end 52 of the substantially hollow movable seat plug 50 is a solid portion 57 that acts like a piston when exposed to the force of compressed gas. The sides 53 of the solid portion 57 may be sized to be large enough to provide a blockage of the flow of compressed gas through the vent holes 46 formed in the tubular valve body. Located on the top of the solid portion 57 is an angled sealing surface 55 for a sealing engagement with the O-ring 44 located within the substantially tubular valve body 30.

As previously indicated, the second or upper end 54 of the substantially hollow movable seat plug 50 is sized to abut the first or lower end 22 of the shear tube 20. Between the first or lower end 52 of the substantially hollow movable seat plug 50 and the second or upper end 54 of the substantially hollow movable seat plug 50 is an open portion 56. Through the wall of the open portion 56 are formed a plurality of vent holes 58. The alignment of vent holes 58 with vent holes 46 allows for the passage of compressed gas when the poppet valve assembly 10 of the present invention is in its normally open condition, as shown in FIG. 3. Formed just above the vent holes 58 on the exterior of the substantially hollow movable seat plug 50 is a second angled surface 60. Above the second angled surface 60 is an upper tubular portion 62 sized for a slidable engagement with the smaller diameter portion 40 of the substantially tubular valve body 30.

At the bottom of the poppet valve assembly 10 of the present invention is a tubular fixed retainer plug 80. As previously explained, the tubular fixed retainer plug 80 is formed to have a lower or first end 82 including external threads 83. External threads 83 engage the internal threads 33 at the first end 32 of the substantially tubular valve body 30. The fixed retainer plug 80 is tubular; that is, it contains a passage through its central portion 84. The top or second end 86 of the tubular fixed retainer plug 80 includes a generally flat surface 87 that is in contact with the flat surface 59 on the bottom of the solid portion 57 at the first end 52 of the substantially hollow movable seat plug 50. Shown in the first embodiment, the tubular fixed retainer plug 80 includes a collar portion 88 which extends upwardly into a recess 61 on the bottom of the substantially hollow movable seat plug 50. This collar portion 88 assists in the alignment of the substantially hollow movable seat plug 50 with the tubular fixed retainer plug 80 when the poppet valve assembly 10 of the present invention is in its normally open condition.

Figure 4:
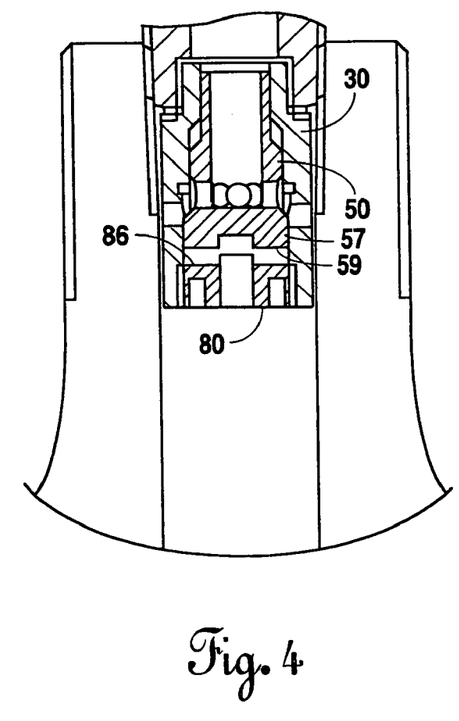
FIG. 4 is an elevational view in partial section of the poppet valve assembly shown in FIG. 2 just after the shear tube has been removed and the bottom of the substantially hollow movable seat plug has just been lifted off the tubular fixed retainer plug by the pressure of the compressed gas escaping from the compressed gas cylinder.
Figure 5:
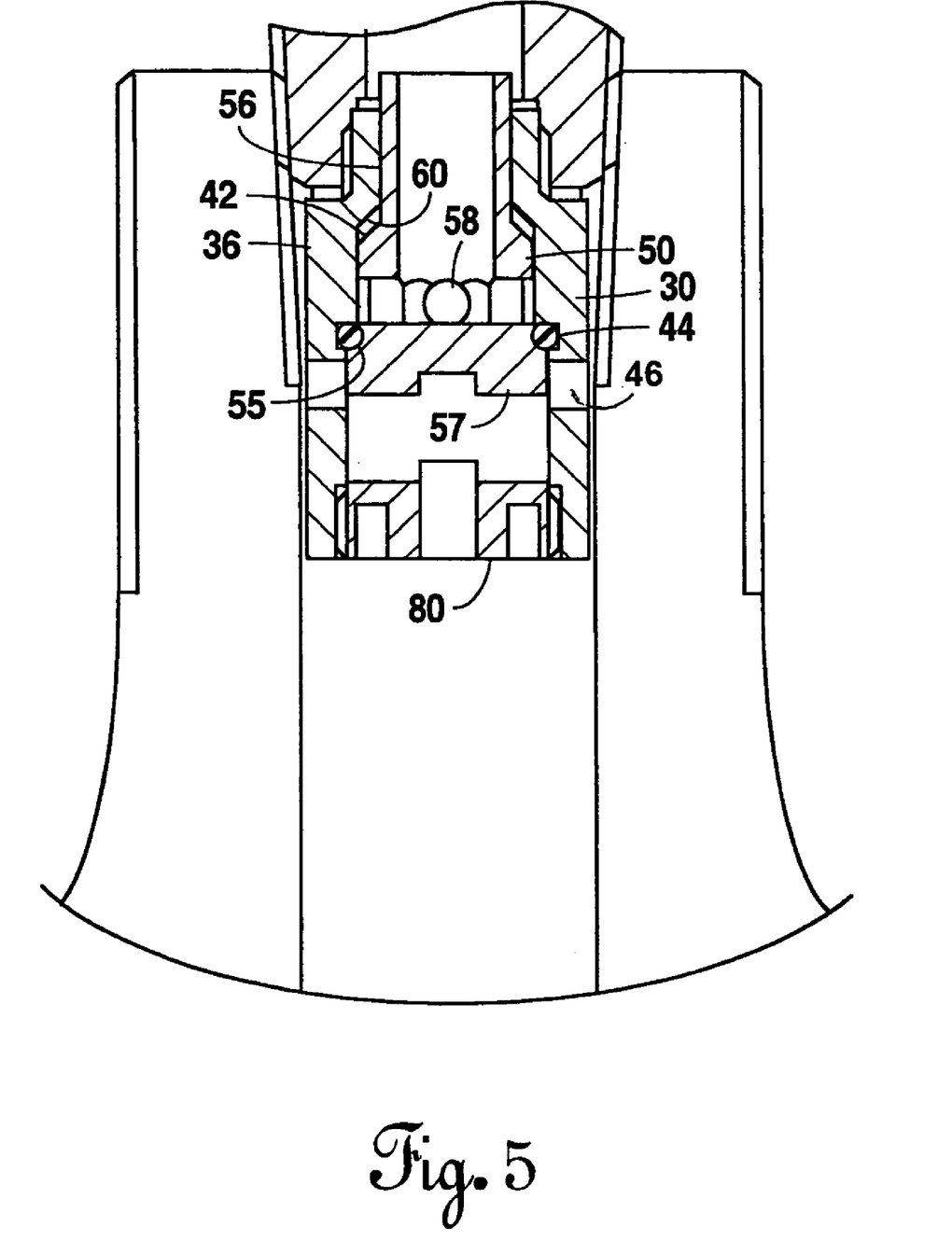
FIG. 5 is an elevational view, in partial section, of the poppet valve assembly shown in FIG. 2 showing the movement of the substantially hollow movable seat plug to a position within the substantially tubular valve body so that a seal is formed preventing the escape of gas from the cylinder.

A still better understanding of the first embodiment poppet valve assembly 10 of the present invention may be had by reference to its operation as shown in FIGS. 3, 4 and 5.

The normally open configuration of the disclosed poppet valve assembly 10 is shown in FIG. 3. Keeping the poppet valve assembly 10 open is the abutment of the first or lower end 22 of the shear tube 20 with the second or upper end 54 of the substantially hollow movable seat plug 50. As shown by the arrows superimposed on FIG. 3, compressed gas exiting from the cylinder 110 flows around the sides of the substantially tubular valve body 30, and then through the vent holes 46 in the sides of the hollow portion 36 of the substantially tubular valve body 30. Once having entered into the hollow portion 36 of the substantially tubular valve body 30, the compressed gas passes through the vent holes 58 formed in the wall of the substantially hollow movable seat plug 50 which are generally in alignment with vent holes 46. The compressed gas then passes up through the substantially hollow movable seat plug 50, through the shear tube 20 and into the flow control valve 100. The solid portion 57 at the first or lower portion 52 of the substantially hollow movable seat plug 50 prevents the compressed gas from flowing through the bottom 59 of the substantially hollow movable seat plug 50.

When the shear tube 20 is removed, the physical force which maintains an abutment between the first or lower end 22 of the shear tube 20 and the second or upper end 24 of the substantially hollow movable seat plug 50 is no longer present. Accordingly, the pressure of the compressed gas on the bottom of the solid portion 57 at the first or lower end 52 of the substantially hollow movable seat plug 50 causes the substantially hollow movable seat plug 50 to act like a hollow piston moving through the cylindrical hollow portion of the substantially tubular valve body 30. As shown in FIG. 4, the pressure of the compressed gas has caused the bottom 59 of the solid portion 57 of the substantially hollow movable seat plug 50 to lift from the top 86 of the tubular fixed retainer plug 80 thus initiating the travel of the substantially hollow movable seat plug 50 through the substantially tubular valve body 30.

In FIG. 5 the substantially hollow movable seat plug 50 has completed its travel path to form a seal by compressing the O-ring 44. This seal prevents the further flow of compressed gas through the poppet valve assembly 10. Specifically, the upper portion 55 of the solid portion 57 on the first or lower portion 52 of the substantially hollow movable seat plug 50 has moved into contact the O-ring 44 within the central portion 36 of the substantially tubular valve body 30 to form a seal.

A close examination of FIG. 5 will reveal that while the sides 58 of the solid portion 57 on the bottom of the substantially hollow movable seat plug 50 have moved into close proximity with the vent holes 46 in the wall of the substantially tubular valve body 30 the sides of the solid portion 57 do not completely block the vent holes 46. Specifically, the lower portion of the vent holes 46 is left open to the pressure of the compressed gas from with the cylinder 110. Accordingly, the compressed gas from within the cylinder 110 not only flows through the tubular fixed retainer plug 80 to act against the bottom surface of the solid portion 57 of the substantially hollow movable seat plug 50, but additional pressure is provided through the passage of a small amount of the compressed gas through the lower portion of the vent holes 46 in the wall of the substantially tubular valve body 30. Alternatively, the solid portion 57 of the substantially hollow movable seat plug 50 may be used to prevent any flow of compressed gas through vent holes 46.

The second embodiment of the poppet valve assembly 210 is similar to the first embodiment 210; however, the shape of the fixed retainer plug 280 and the solid portion 257 on the bottom 252 of the substantially hollow movable seat plug 250 has been changed. As will be seen in FIGS. 6, 7, and 8, similar portions of the disclosed system appearing in the second embodiment include a reference number with a "2" in the hundreds place.

Figure 6:
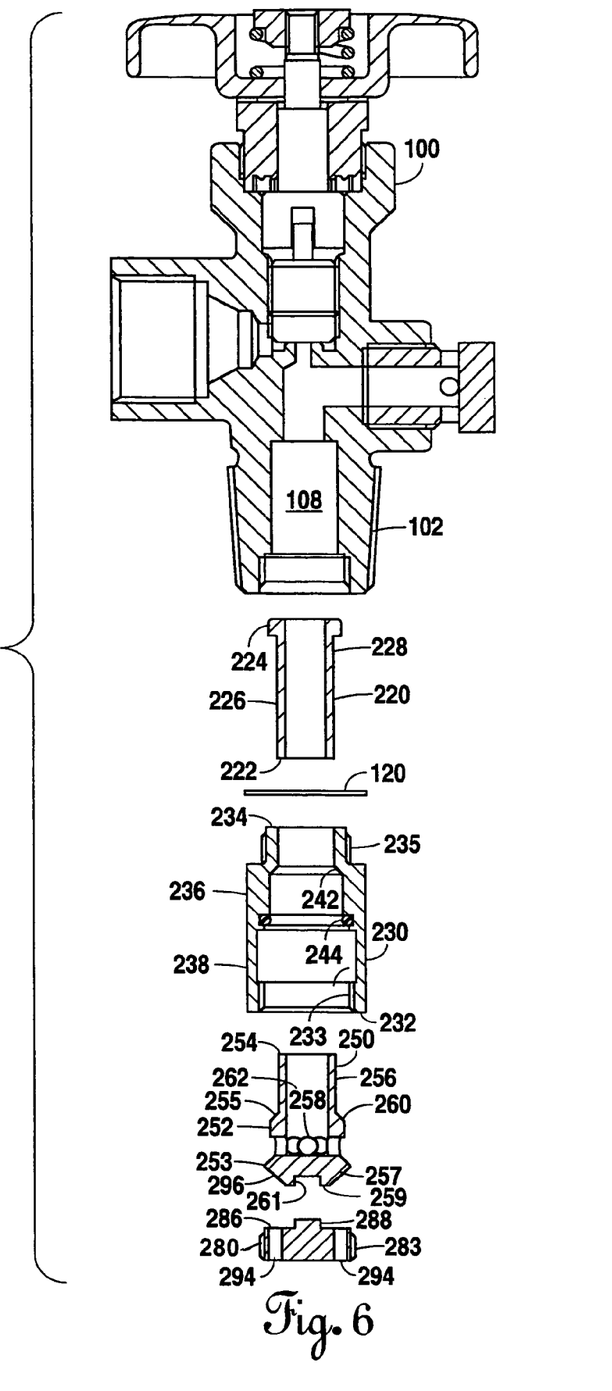
FIG. 6 is an exploded view, in partial section, of a second embodiment of the poppet valve assembly of the present invention.

As in the first embodiment 10 an O-ring 244 is placed within the hollow portion 236 of the substantially tubular body 230. It is the compression of this O-ring 244 which forms the seal that prevents the escape of gas from cylinder 110.

Figure 7:
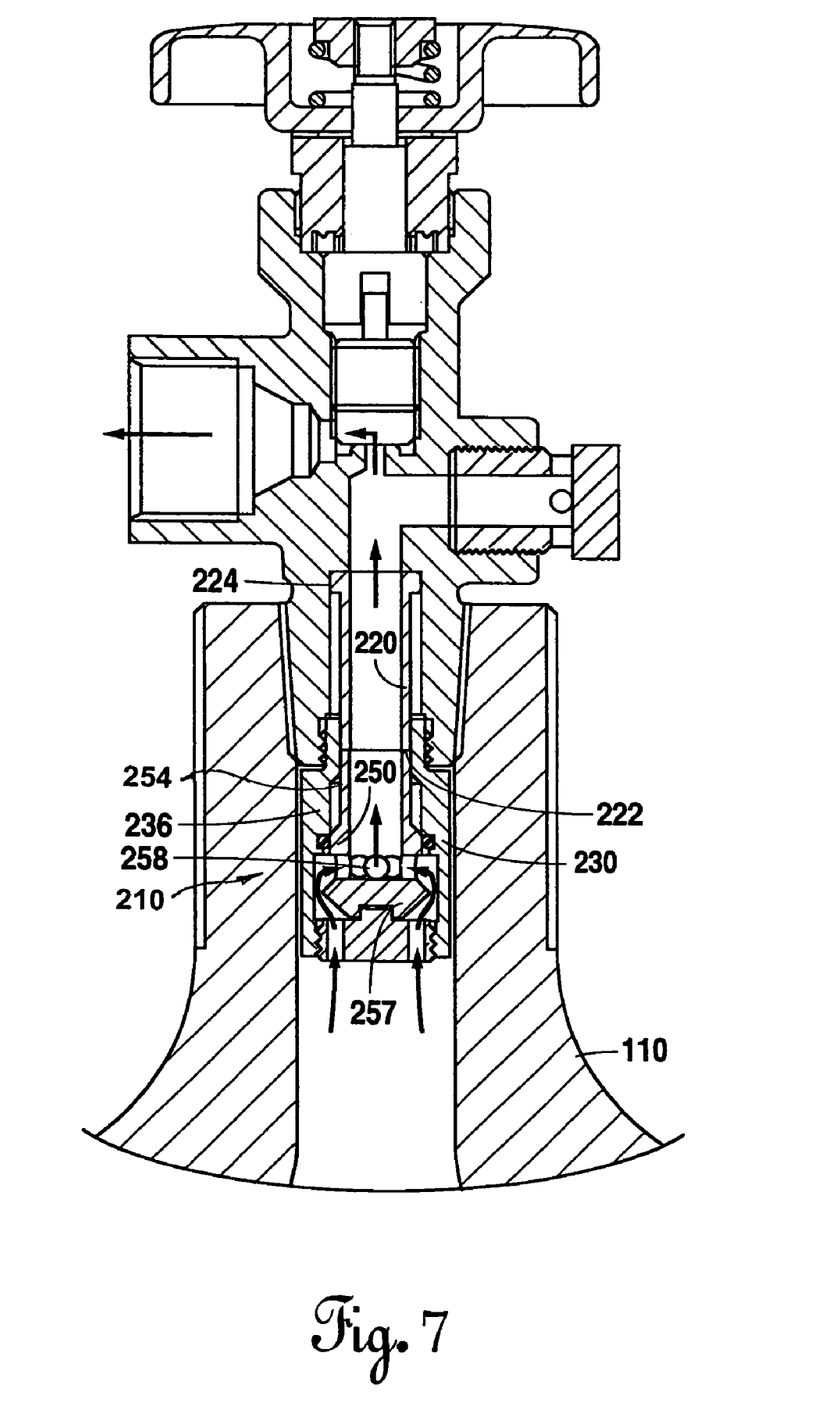
FIG. 7 is an elevational view, in partial section, of the poppet valve assembly shown in FIG. 6 in its normally open configuration allowing the controlled exit of compressed gas from the cylinder through the flow control valve.

In contrast to the first embodiment 10 no vent holes pass through the wall of the hollow portion 236 of the substantially tubular valve body 230. Instead and as shown in FIG. 7, the passage of the compressed gas from the cylinder 110 when the poppet valve assembly 10 of the present invention is in its normally open condition is through two passages 294 formed in the fixed retainer plug 280. The compressed gas then flows around the lower portion 296 of the solid portion 257 at the lower end 252 of the seat plug 250 thence through the vent holes 258 in the seat plug 250.

As in the first embodiment 10 it is the substantially hollow movable seat plug 50 whose movement causes the poppet valve assembly 10 to go from a normally open condition to a closed condition when the shear tube 220 is removed or substantially damaged. Located on the top of the solid portion 257 is an angled sealing surface 255 for engagement with the O-ring 244 located within the substantially tubular valve body 230.

At the bottom of the second embodiment of the poppet valve assembly 210 is a fixed retainer plug 280. As in the first embodiment the fixed retainer plug 280 is formed to have a lower or first end 282 including external threads 283. External threads 283 engage the internal threads 233 at the first end 232 of the substantially tubular valve body 230. The fixed retainer plug 280 contains one or more passages 294. The top or second end 286 of the fixed retainer plug 280 includes a generally flat surface 287 that is in contact with the flat surface 259 on the bottom of the solid portion 257 at the first end 252 of the substantially hollow movable seat plug 250. Shown in the second or preferred embodiment the fixed retainer plug 280 includes a collar portion 288 which extends upwardly into a recess 261 on the bottom of the substantially hollow movable seat plug 250. This collar portion 288 assists in the physical and axial alignment of the substantially hollow movable seat plug 250 with the fixed retainer plug 280 when the poppet valve assembly 210 is in its normally open condition.

Figure 8:
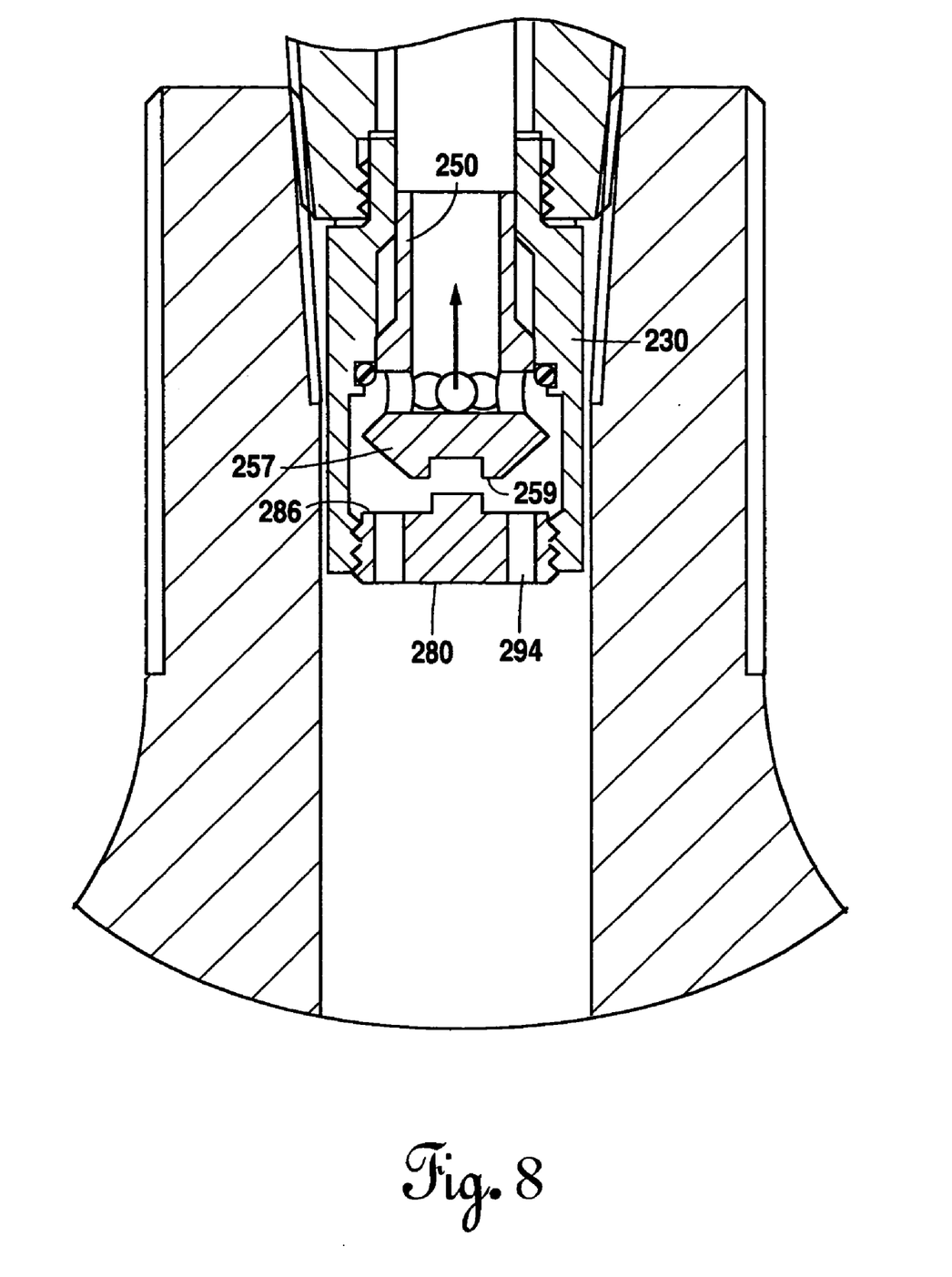
FIG. 8 is an elevational view, in partial section, of the poppet valve assembly shown in FIG. 6 just after the shear tube has removed and the bottom of the substantially hollow movable substantially hollow movable seat plug has just been lifted off the tubular fixed retainer plug by the pressure of the gas escaping from the compressed as cylinder.
Figure 13:
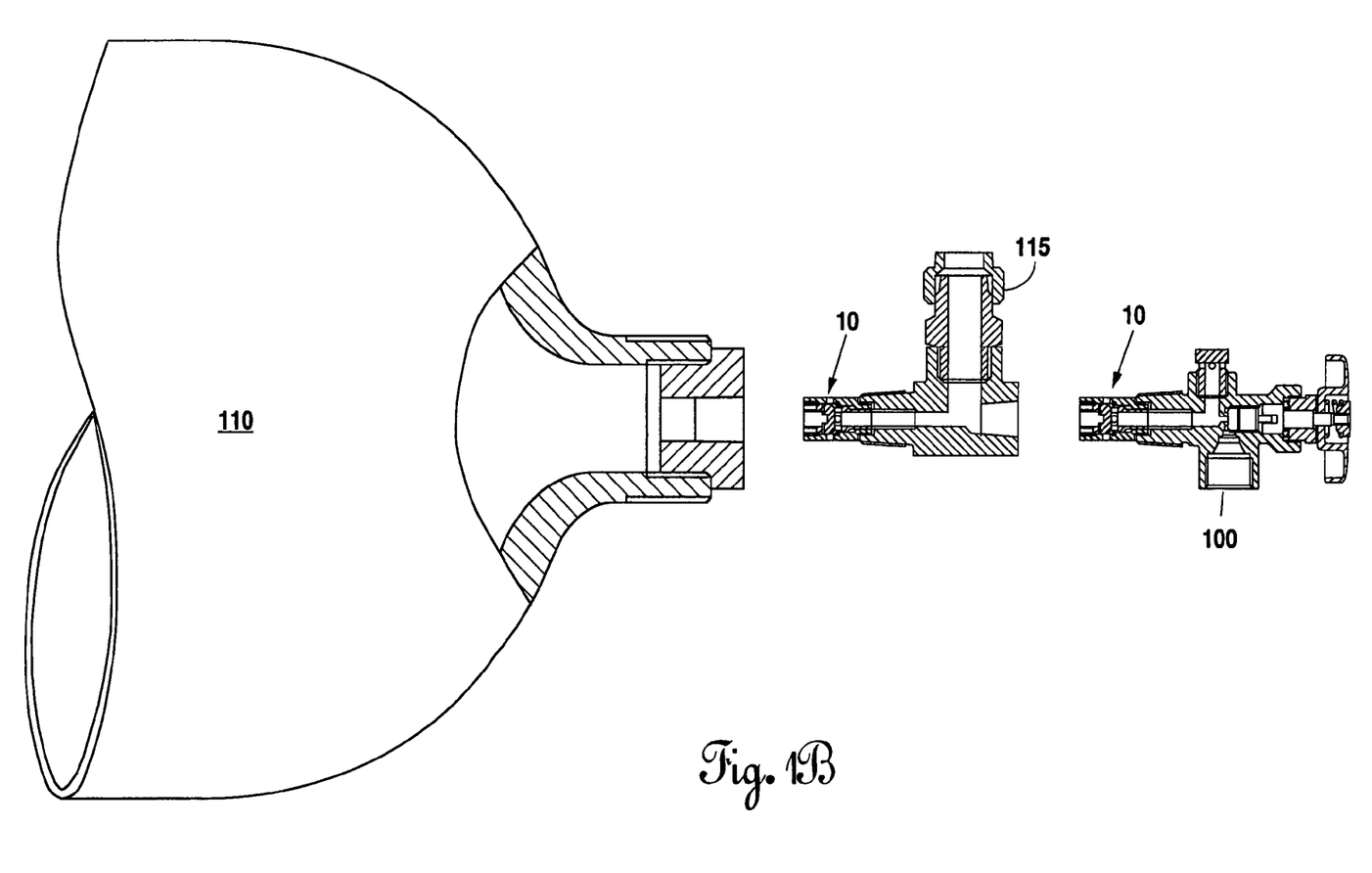

A better understanding of the second embodiment of the poppet valve assembly 210 may be had by reference to its operation as shown in FIGS. 7, and 8.

The normally open configuration of the disclosed poppet valve assembly 210 is shown in FIG. 7. Keeping the poppet valve assembly 210 open is the abutment of the first or lower end 222 of the shear tube 220 with the second or upper end 254 of the substantially hollow movable seat plug 250. As shown by the arrows superimposed on FIG. 7, compressed gas exiting from the cylinder 110 flows through the fixed retainer plug 280, around the solid portion 257 of the substantially hollow movable seat plug 250, through at least one vent hole 258, through seat plug 250, through shear tube 220 and into the flow control valve 100.

When the shear tube 220 is removed, the physical force which maintains an abutment between the first or lower end 222 of the shear tube 220 and the second or upper end 224 of the substantially hollow movable seat plug 250 is no longer present. Accordingly, the pressure of the compressed gas on the bottom of the solid portion 257 at the first or lower end of the substantially hollow movable seat plug 250 caused the substantially hollow movable seat plug 250 to act like a hollow piston moving through the cylindrical hollow portion of the substantially tubular valve body 230. As shown in FIG. 8, the pressure of the compressed gas has caused the bottom 259 of the solid portion 257 of the substantially hollow movable seat plug 250 to lift from the top 286 of the fixer retainer plug 280 thus initiating the travel of the substantially hollow movable seat plug 250 through the substantially tubular valve body 230.

As in the first embodiment, when the substantially hollow movable seat plug 250 has completed its travel path to form a seal by compressing O-ring 244. This seal prevents the further flow of compressed gas through the poppet valve assembly 210. Specifically, the upper portion 255 of the solid portion 257 on the first or lower portion 252 of the substantially hollow movable seat plug 250 contacts the O-ring 244 within the central portion 236 of the substantially tubular valve body 230 to form a seal. It is this seal that provides a barrier to the flow of compressed gas from the cylinder 110.

While the poppet valve assembly of the present invention has been described according to a first and a second embodiment, those of ordinary skill in the art will understand that numerous variations and other embodiments have been enabled by the foregoing disclosure. Such variations and embodiments shall fall within the scope and meaning of the appended claims.

What is claimed is:

1. A poppet valve assembly for preventing the exit of compressed gas from a container through a flow control valve, said poppet valve assembly comprising:
   a hollow member constructed and arranged to be retained within the flow control valve;
   a spring-less sliding valve retainable in a normally open condition by physical contact with said hollow member, said normally open condition allowing compressed gas to flow out of the container into the flow control valve;
   said spring-less sliding valve including a surface in contact with the compressed gas within the container;
   said spring-less sliding valve further including a fixed portion including at least one passage therethrough to enable the compressed gas to contact said spring-less sliding valve;
   wherein when said hollow member is removed, the force of the compressed gas within the container causes the spring-less sliding valve to change from its normally open condition to a closed condition, thus preventing the rapid escape of gas from the container.

2. The poppet valve assembly as defined in claim 1 wherein when said spring-less sliding valve is in its closed condition, a seal is formed between a surface on an inner portion of said spring-less sliding valve and on O-ring placed within an outer portion of said spring-less sliding valve.

3. The poppet valve assembly as defined in claim 2 wherein said inner portion of said spring-less sliding valve operates as a piston in response to compressed gas flowing through said fixed portion of said spring-less sliding valve when the condition of said spring-less sliding valve changes from normally open to closed.

4. A poppet valve assembly suitable for use with a flow control valve for sealing the outlet of a vessel for storing compressed gas, said poppet valve assembly comprising:
   a shear tube having a first end, a second end, and a hollow portion therebetween;
      said first end of said shear tube being constructed and arranged for mounting interfitment within the flow control valve;
   a substantially tubular valve body having a first end, a second end, and a hollow portion therebetween;
      said first end of said substantially tubular valve body including an internally threaded portion;
      said second end of said substantially tubular valve body including external threads and an interior surface for slidable engagement with the exterior portion of said hollow portion of said shear tube;
   a substantially hollow movable seat plug having a solid first end, an open second end, and a holly portion therebetween;
      said solid first end of said substantially hollow movable seat plug sized for travel through the interior portion of said second end of said hollow portion of said substantially tubular valve body;
      said open second end of said substantially hollow movable seat plug having at least one vent opening therethrough;
   a fixed retainer plug having a first end, a second end, and at least one flow passage therebetween;
      said first end of said fixed retainer plug constructed and arranged for insertion into the vessel;
      said second end of said fixed retainer plug having a surface engageable with said solid first end of said substantially hollow movable seat plug;
      said fixed retainer plug including external threads for engagement with the internal threads at said first end of said substantially tubular valve body;
   whereby when said shear tube is removed, the force of the compressed gas within the vessel passes through said fixed retainer plug to contact said solid first end of said substantially hollow movable seat plug to move it through said substantially tubular valve body so that said substantially hollow movable seat plug moves through the hollow portion of said substantially tubular valve body to form a seal within said substantially tubular valve body preventing the inadvertent loss of gas from the vessel.

5. The poppet valve assembly as defined in claim 4 wherein said seal is formed with an O-ring mounted within said substantially tubular valve body.

6. A compressed gas storage system comprising:
   a container for the compressed gas, said container including at least one opening and at least one flow control valve;
   a spring-less sliding valve assembly suitable for interaction with said flow control valve for preventing flow of compressed gas from said container in the event of removal of said flow control valve;
   said spring-less sliding valve assembly including:
      means for physically retaining said spring-less sliding valve assembly in a normally open condition;
      a tubular housing;
      a hollow piston constructed or arranged for sliding movement within said tubular housing;
      a retainer plug for positioning said hollow piston when said spring-less sliding valve assembly is in a normally open condition;
   whereby when said means for physically retaining said spring-less sliding valve in a normally open condition is removed, said hollow piston will move within said tubular housing to form a seal preventing the exit of compressed gas from the container.

7. The compressed gas storage system as defined in claim 6 wherein said means for physically retaining said spring-less sliding valve assembly in a normally open condition is a physical force preventing the movement of said hollow piston within said tubular housing.

8. The compressed gas storage system as defined in claim 7 wherein removal of said flow control valve will remove said spring-less physical force maintaining said spring-less sliding valve assembly in a normally open condition.

9. The compressed gas storage system as defined in claim 6 wherein said seal is formed by contact between a surface formed on the exterior of said hollow piston and an O-ring within said tubular housing.

* * * * *